United States Patent [19]
Takaoka et al.

[11] Patent Number: 5,162,925
[45] Date of Patent: Nov. 10, 1992

[54] COLOR IMAGE PROCESSOR CAPABLE OF PERFORMING MASKING USING A REDUCED NUMBER OF BITS

[75] Inventors: Makoto Takaoka, Tokyo; Shigetada Kobayashi, Yokohama, both of Japan

[73] Assignee: Canon Kabushiki Kaisha, Tokyo, Japan

[21] Appl. No.: 700,329

[22] Filed: May 9, 1991

Related U.S. Application Data

[63] Continuation of Ser. No. 436,759, Nov. 15, 1989, abandoned.

Foreign Application Priority Data

[30] Nov. 17, 1988 [JP] Japan .............. 63-288874

[51] Int. Cl.$^5$ .............................................. H04N 1/40
[52] U.S. Cl. ................................... 358/447; 358/75; 358/80
[58] Field of Search ............... 358/75, 447, 463, 13 C, 358/80

[56] References Cited

U.S. PATENT DOCUMENTS

| | | | |
|---|---|---|---|
| 4,636,844 | 1/1987 | Sasaki | 358/80 |
| 4,654,721 | 3/1987 | Goertzel et al. | 358/283 |
| 4,670,793 | 6/1987 | Yamada et al. | 358/447 X |
| 4,672,463 | 6/1987 | Tomohisa et al. | 358/447 |
| 4,727,434 | 2/1988 | Kawamura | 358/75 X |
| 4,745,466 | 5/1988 | Yoshida et al. | 358/80 |
| 4,791,678 | 12/1988 | Iwase et al. | 358/447 X |
| 4,876,610 | 10/1989 | Ohsawa et al. | 358/443 |
| 4,878,125 | 10/1989 | Katayama et al. | 358/443 |
| 4,920,501 | 4/1990 | Sullivan et al. | 358/463 X |
| 4,924,322 | 5/1990 | Kurosawa et al. | 358/463 X |
| 4,953,013 | 8/1990 | Tsuji et al. | 358/447 X |
| 4,958,218 | 9/1990 | Katayama et al. | 358/75 |
| 4,958,236 | 9/1990 | Nagashima et al. | 358/445 |
| 4,958,238 | 9/1990 | Katayama et al. | 358/456 |
| 4,969,052 | 11/1990 | Ishida et al. | 358/457 |
| 4,975,786 | 12/1990 | Katayama et al. | 358/459 |
| 5,008,950 | 4/1991 | Katayama et al. | 382/50 |
| 5,068,746 | 11/1991 | Ohsawa et al. | 358/443 |
| 5,086,484 | 2/1992 | Katayama et al. | 382/50 |

Primary Examiner—Jack B. Harvey
Assistant Examiner—Glenn W. Brown
Attorney, Agent, or Firm—Fitzpatrick, Cella, Harper & Scinto

[57] ABSTRACT

A color image processor inputs the color image data of one color-separated picture element, weights the input color image data, reduces the amount of information of the weighted color image data and outputs the reduced color image data.

26 Claims, 8 Drawing Sheets

COLOR IMAGE PROCESSOR CAPABLE OF PERFORMING MASKING USING A REDUCED NUMBER OF BITS

This application is a continuation of application Ser. No. 07/436,759, filed Nov. 15, 1989, abandoned.

BACKGROUND OF THE INVENTION

1. Field of the Invention

This invention relates to a color image processor, and for example more particularly to a color image processor having a masking function for masking a digital color image signal.

2. Description of the Related Art

Hitherto, color correcting masking processes have been employed in this kind of system. As for this masking process, the following linear masking equations shown as (1) through (3) corresponding to each color signal of yellow (Y), magenta (M) and cyan (C), are often adopted:

$$Y_0 = a_{11}Yi + a_{12}Mi + a_{13}Ci \quad (1)$$

$$M_0 = a_{21}Yi + a_{22}Mi + a_{23}Ci \quad (2)$$

$$C_0 = a_{31}Yi + a_{32}Mi + a_{33}Ci \quad (3)$$

There is a table-referring method for realizing these equations.

Figure 1:
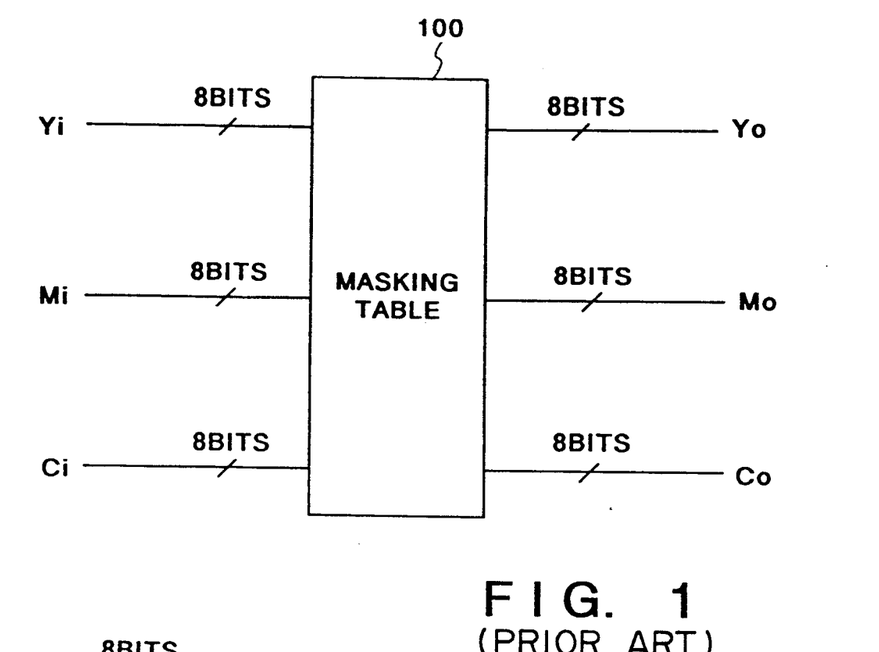
FIG. 1 shows the main compositions explaining the conventional masking method.

FIG. 1 shows a block diagram of the main components for explaining the masking method of the prior art. In the referring method of the prior art, the output image data, Yo, Mo and Co, with the unnecessary color components deleted, are stored in advance in the table corresponding to the combinations of the concentrations of the digital color image signals, Yi, Mi and Ci, which are inputted to the masking table 100 in this figure, and the output image data, Yo, Mo and Co, corresponding to the combination addresses of the color image signals, Yi, Mi and Ci, which are inputted at the time of image processing, are read out from the masking table 100 and are outputted.

The masking table 100 shown in FIG. 1 is taken from the prior art, and the input color image signals, Yi, Mi and Ci, re represented as 8-bit signals for each 1 picture element, and at the same time the output image signals, Yo, Mo and Co, are also represented as 8-bit signals.

However, in the above described example of the prior art, a memory capacity of $3 \times 2^{24}$ bytes (48 megabytes) is required to obtain the output image data, Yo, Mo and Co, since the combination addresses of the input color image signals Yi, Mi and Ci are $2^{24}$ and each corresponding output contains the output of 3 colors consisting of 1 byte (8 bits) each.

Thus, a disadvantage of the table-referring method of the prior art is that an enormous memory capacity is required to perform accurate masking processes.

Alternatively, the following method can be used to reduce the size of the masking table as above mentioned. In this method, the color corrected signals in each color at the time of output are obtained by using the upper-order M bits in the N bits (N>M) of digital color image signal as the input address when the masking process is performed on the N-bits digital color image signal which is separated into a plurality of colors.

Figure 2:
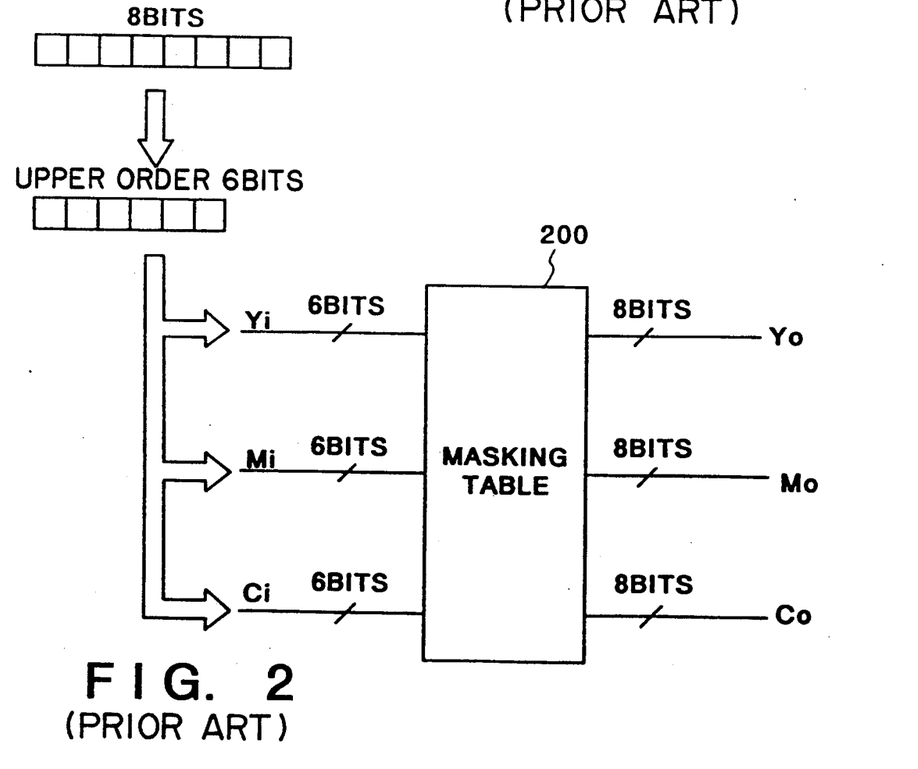
FIG. 2 shows the main compositions of a masking method different from that shown in FIG. 1.

In this method, as shown in FIG. 2, a difficult masking table 200, instead of the masking table 100 of the prior art is used. The upper-order 6 bits of the input color image signal of 8-bit data are used for the address data inputted to the masking table 200, and the lower-order 2 bits are eliminated. In this case, the number of the combination addresses of the input color image signals, Yi, Mi and Ci, is $2^{18}$, and the required memory capacity is $3 \times 2^{18}$ bytes (768 kilobytes). Therefore, the memory requirements can be drastically reduced in this way, avoiding a masking table using a full $3 \times 8$-bit address.

Figure 3:
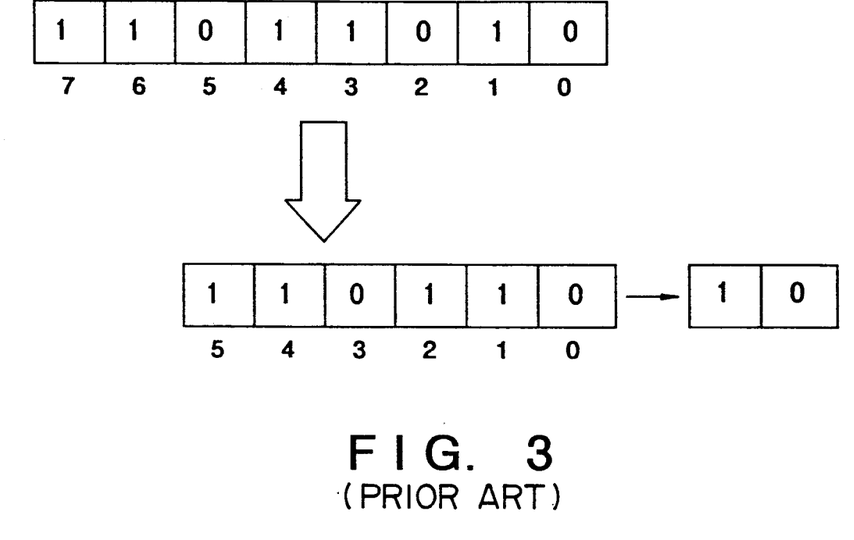
FIG. 3 shows the conventional method for reducing lower-order bit.

Now, the method for reducing the input color image signal from 8-bits to 6-bits will be explained. In this method, as shown in FIG. 3, the data of 8-bits can be shifted to the right by two bits. However, it is unavoidable that the accuracy of the data is reduced by reducing the data by up to three pieces for each two bits deleted. Thus, when the above simple method to discard the lower-order 2 bits of 8-bit data is employed, the data of photographic density having 256 gradations are forcibly reduced to 64 gradations and the density expressing ability at high gradation is lost accordingly.

SUMMARY OF THE INVENTION

The purpose of this invention is to eliminate the disadvantage of the above mentioned conventional example.

Another purpose of this invention is to provide a color image processor which can reduce data as much as possible without decreasing the ability of expression of density with data having much information.

Still another purpose of this invention is to provide a color image processor which can perform accurate $\gamma$ conversion while decreasing accuracy as little as possible.

According to one aspect of this invention is provided a color image processor comprising an input means inputting the color-separated color image data of 1 picture element, a weighting means weighting the aforementioned input color image data, a reducing means reducing the amount of information of the aforementioned weighed color image data and an outputting means outputting the aforementioned reduced color image data.

According to another aspect of this invention is provided a color image processor comprising an inputting means inputting color-separated picture element data, a diffusing means diffusing the errors of the aforementioned inputted picture elements data to other picture elements a reducing means reducing the amount of information from the aforementioned diffused picture elements and an outputting means outputting the aforementioned reduced picture element data.

Other purposes, features and advantages of this invention will be clarified by reference to the following detailed description of the preferred embodiments taken in conjunction with the following attached figures.

DETAILED DESCRIPTION OF THE PREFERRED EMBODIMENTS

The following description, together with reference to the attached figures, explains in detail the preferred embodiments of this invention.

Figure 4:
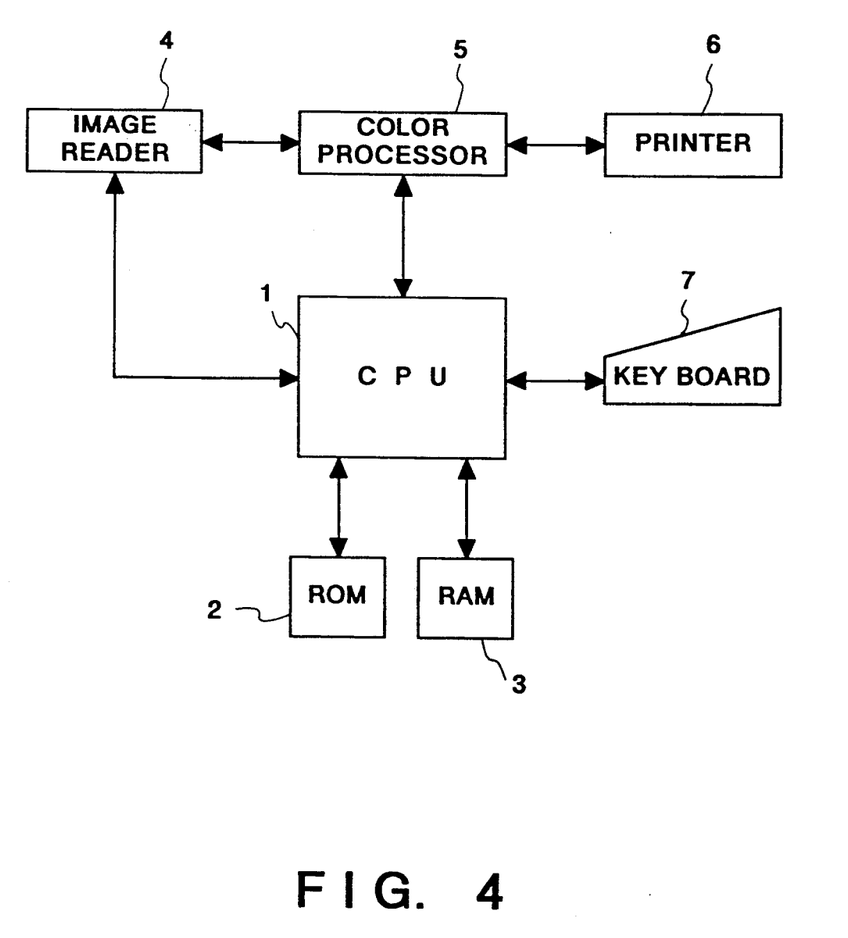
FIG. 4 shows a block diagram of the composition of the color image processor of this embodiment.

FIG. 4 shows a block diagram of a color image processor of this invention. As shown in this figure, the image processor has the following components: a CPU 1 controlling the whole system; a ROM 2 housing the control program activating the CPU 1, the error handling program and the programs ordered by flow chart as described later; a RAM 3 used as a work area for executing the various programs housed in ROM 2 and as a temporary escape area for error handling; an image reader 4 for reading the draft optically with such means as the image scanner; a color processor 5 which produces the output image data (print image data) of each color component (Y, M and C) after performing the analogue/digital conversion of the input color image signal, that is, the masking process as explained later in FIG. 5; a printer 6 for printing and forming the output image of 3 colors, Y, M and C, on the recording paper based on the print image data produced by the color processor 5; and a keyboard 7 having keys for directing functions of every kind, such as a key for directing the reading of the draft.

Next, the main components of the color processor 5 of this embodiment will be explained.

Figure 5:
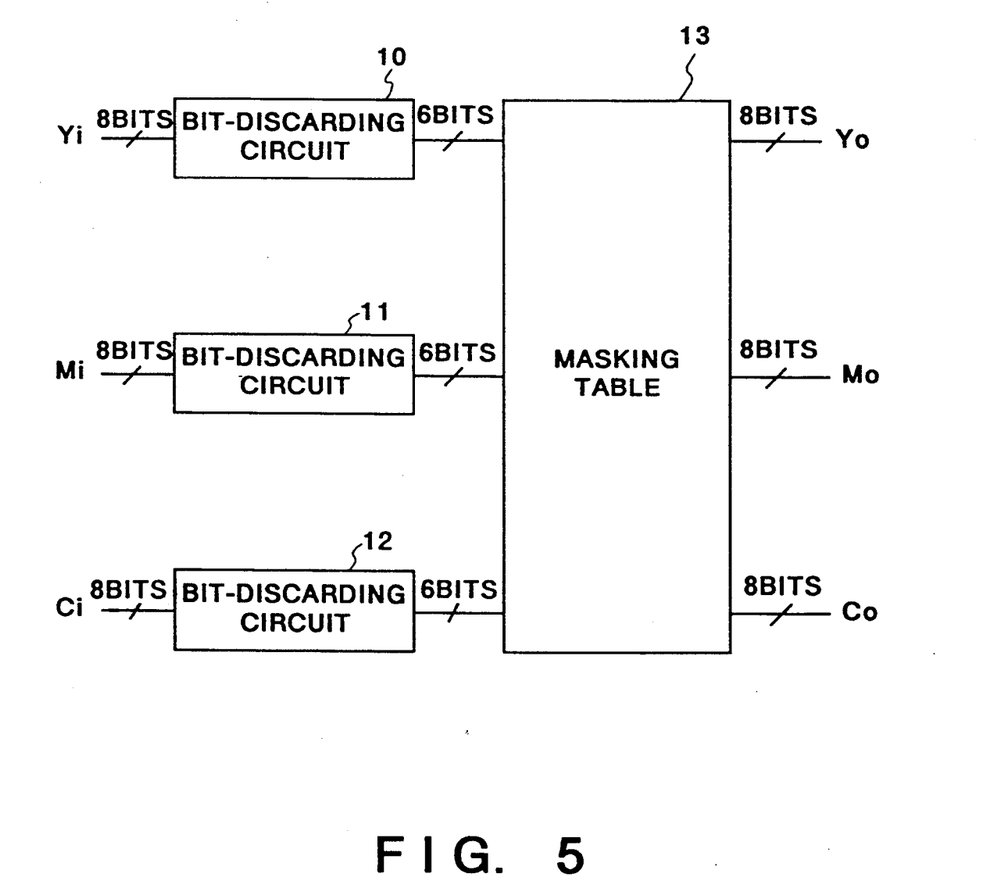
FIG. 5 shows the main composition of the color processor of this embodiment.

FIG. 5 shows a block diagram of the main components of the color processor 5 of this embodiment. In this figure, 10 to 12 denote the bit-discarding circuits of this embodiment for diffusing errors and 13 denotes the masking table. The aforementioned bit-discarding circuits 10 to 12 all have the same composition and functions.

First, the bit discarding circuits 10 to 12 of this embodiment will be explained.

Figure 6:
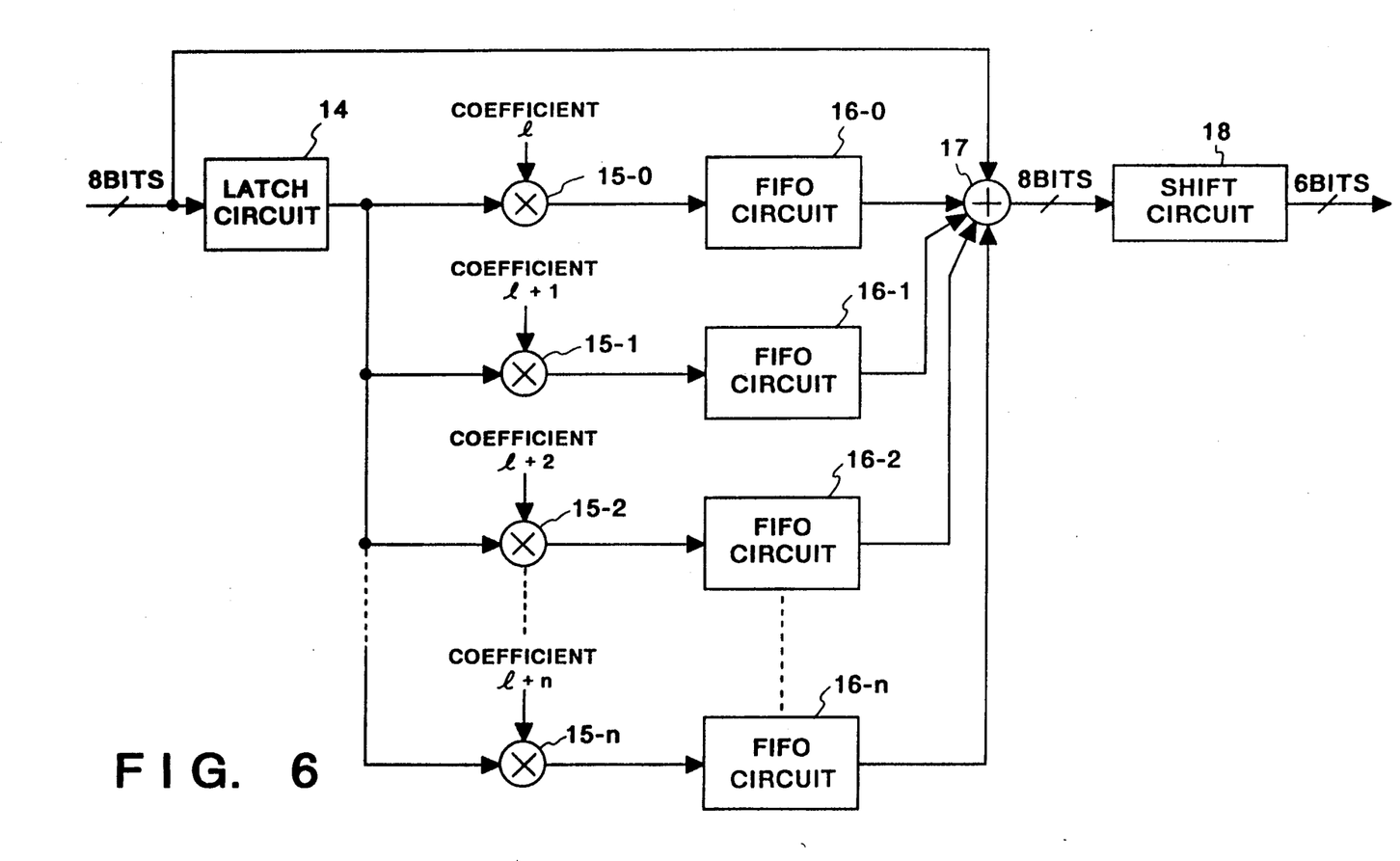
FIG. 6 shows the internal composition of an error diffusing bit-discarding circuit 10.

FIG. 6 is a circuit diagram showing the internal composition of the bit-discarding circuits of this embodiment. In this figure, 14 represents a D type latching circuit latching the lower-order 2 bits of the picture element data, that is, the input color image signals Yi, Mi and Ci (8 bits). 15-0 to 15-n show the multipliers multiplying the latched data latched by the latch circuit 14 by the weighting coefficient (1 to 1+n), respectively. 16-0 to 16-n show the FIRST IN FIRST OUT (FIFO circuit) saving the multiply results output from each multiplier 15-0 to 15-n, respectively. Each multiplier 15-0 to 15-n is mounted for delaying the input image data for an interval of the image data equivalent to the matrix shown later in FIG. 7B, and the delay times differ from each other. The aforementioned results obtained by calculation are used as diffusion data for diffusing the errors to the following surrounding picture elements of the picture elements under consideration (hereinafter to be called the objective picture elements). 17 represents an adder adding the color image data consisting of the input image signal (8 bits) and the diffused data saved by the FIFO circuits 16-0 to 16-n. 18 is a shift circuit for converting to 6 bits the 8-bit data obtained by adding by the adder 17. The shaft circuit 18 converts to 6-bit data by shifting in the direction of the lower-order bit, that is, shifting 2 bits to the right.

The process performed by the bit-discarding circuit of this embodiment will be explained.

Figure 7A:
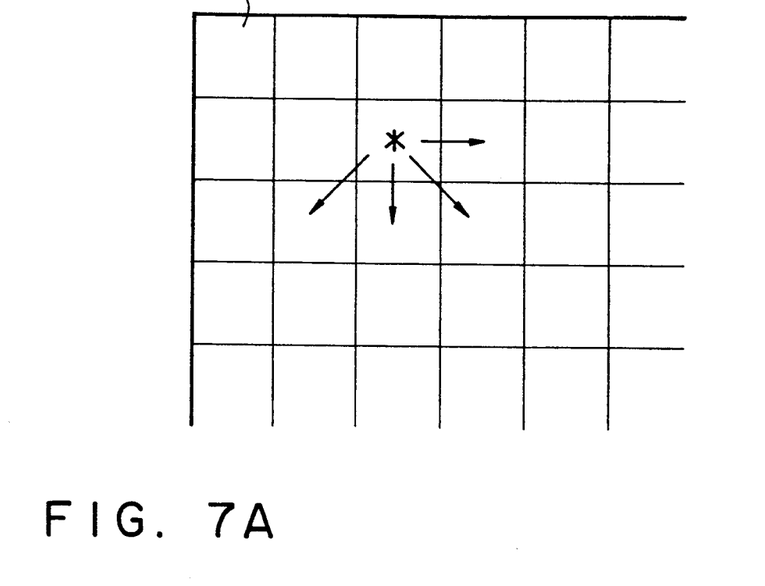
FIG. 7A and FIG. 7B explain the error diffusing method of this embodiment.
Figure 7B:
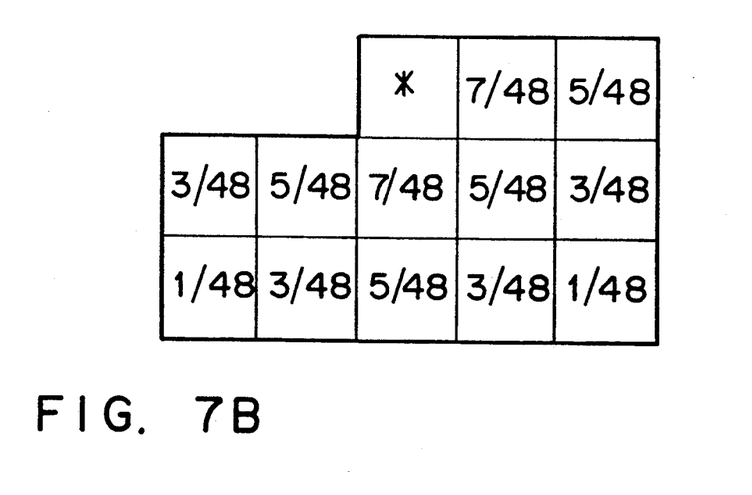

FIGS. 7A and B explain the method for diffusing the errors of this invention. An asterisk (*) in FIG. 7A shows the objective picture elements. An arrow extending from the objective picture elements shows the direction in which the errors are diffused, and a position shown as E is the first of the objective picture elements. The error diffusion matrix (diffusion matrix) as shown in FIG. 7B is used in this embodiment to diffuse the errors in the direction of the above arrow. The 12 (n=11) set of data in this matrix show the weighting coefficients which are to be multiplied with the latch data. An asterisk (*) in FIG. 7B also shows the objective picture elements in the diffusion matrix. First, although 2 bits can be shifted to the right to reduce the 8-bit data to 6-bit data, if the lower-order 2 bits are discarded as they are, values of a maximum of 3 which the lower-order 2-bit can express are lost and hence a decrease in the accuracy of the data results. Therefore, as shown in FIG. 6, the method for diffusing the latch data to the surrounding picture elements is employed after being multiplied with the weighting coefficients. The weighting coefficients of the diffusion matrix, with which the latch data are to be multiplied, are determined in accordance with the distance from the picture element having the data to be shortened, such that the smaller the distance, the greater the coefficient, and vice versa. For example, when the latch data is 10 in the binary system, that is, when it is 2 in the decimal system, the error produced by data reduction is diffused by multiplying the latch data with the surrounding picture elements such as $7/48 \times 2$ or $5/48 \times 2$. Furthermore, the values which are already stored in the FIFO circuit in the former step such as $7/48 \times a_1$, $5/48 \times a_{1\ 1}$, $3/48 \times a_{1+2}$ and so on, are added to the lower-order 2 bits of the objective picture element. After this, loss of data accuracy is prevented by shifting the 8-bit data of the input color image data to 6-bit data and discarding the lower-order 2 bits.

Next, the embodiment of action of the bit-discarding circuits 10 to 12 is explained referring to FIGS. 6, 7 A and 7 B.

First, color image data of 8-bits for each of Y, M and C is input. The lower-order 2 bits of this input color image data are removed and latched by the latch circuit 14. The latched data latched by the latch circuit 14 and each of the weighting coefficient (FIG. 7 B) are multiplied by the multiplication circuit 15-0 to 15-n. The multiplication results produced this way are saved by the FIFO circuits 16-0 to 16-n corresponding to each of the multipliers 15-0 to 15-n. Next, the diffusion data saved in the FIFO circuits 16-0 to 16-n and the input color image data of 8-bits are added by the adder 17. Thus, the color image data of the objective picture elements are weighted with some of the errors of the surrounding picture elements and the 8-bits of data considered as reducing the accuracy at the time of the reduction in the number of bits are calculated. This 8 bit of data is shifted to the right by 2 bits when input to the shift circuit 18, and output after conversion into the color image data of 6 bits. For example, in the case of the color image data at the position E of the head picture element as shown in FIG. 7 A, since multiplying with the weighting coefficients of the diffusion matrix is not yet performed in a foregoing part, the lower-order 2 bits of the input image data are reduced by the shift circuit 18 only in this case. However, because the errors are diffused at the surroundings of the head of the picture element of point E, that is, the color image data of the picture elements of the latter part, the lower-order 2 bits of the color image data of point E are latched by the latch circuit 14, multiplied with the weighting coefficients corresponding to the diffusion matrix shown in FIG. 7 B, and a respective one result obtained by multiplying is saved by each of the FIFO circuits 16-0 to 16-n. And when the color image data of the next picture elements are input into the bit-discarding circuits 10 to 12, the lower-order 2 bits are latched by the latch circuit 14 in the same way in which the aforementioned action of the head (lead) picture element and the diffusion matrix are multiplied with the latch data at the multipliers 15-0 to 15-n. Each product is saved by the corresponding FIFO circuit from among 16-0 to 16-n. Hereafter, each datum delayed by the FIFO circuits 16-0 to 16-n is augmented with the objective picture elements to be processed, that is, the color image data (8 bits) of the next picture elements within the diffusion matrix of the head picture element by the adder 17. Therefore, when the objective picture elements of a specific position is processed by the bit-discarding circuits 10 to 12, the diffusion data diffused by the foregoing part is added to the color image data of the objective picture elements and the lower-order 2 bits are discarded from the results obtained.

Next, the overall action of this embodiment will be explained.

Figure 8:
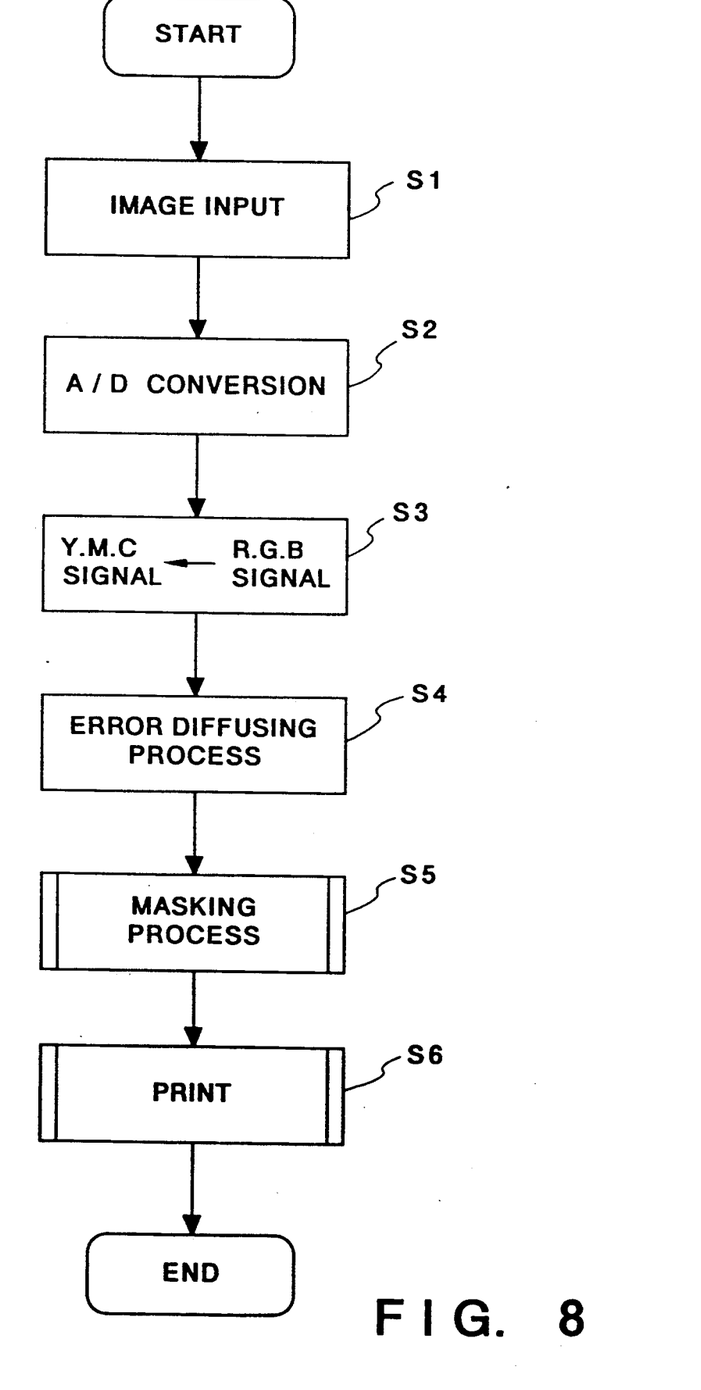
FIG. 8 shows a flow chart explaining the function of the CPU 1 of this embodiment.

FIG. 8 shows a flow chart explaining the action of the CPU 1 of this embodiment.

First, the image is read according to the print instruction of the keyboard 7 (Step S1). Next, the A/D conversion is performed in the color processor (not drawn) and each R, G and B signal that is A/D converted is further converted into each Y, M and C signal (Step S2, Step S3). Each Y, M and C signal is input as the input color image signal, Yi, Mi and Ci to the bit-discarding circuit 10 to 12 as shown in FIG. 5. Here, the actions of the bit-discarding circuits 10 to 12 are briefly explained along the above explanation. First, the diffusion data of the objective picture elements is accumulated sequentially in the bit-discarding circuits 10 to 12, to diffuse it to the surrounding picture elements, and the input color image data of the objective picture elements is corrected based on the diffusion data accumulated in the more foregoing part than the objective picture elements. The corrected input color image data is further reduced to 6-bit data (Step S4). This 6-bit data is converted to 8-bit data by the masking table which realizes the equation (1) explained in the former example (Step S5). This converted output 8-bit data is output as the output image data, Yo, Mo and Co, to the printer 6, and printing is executed (Step S6). Thus, a fine color image with high repeatability can be printed.

Thus, when a reduction in the memory capacity of the masking table is required, although the errors remain when the lower-order 2 bits of the input color image data are simply deleted, the errors produced by the bit reduction are reduced by attaching the circuit which accumulates the errors to be deleted and diffuses them to the surrounding picture elements.

Therefore, accurate masking is realized in this embodiment while sacrificing as little of the accuracy of the image data with reduced memory capacity of the masking table as possible.

Although the floating-points are required when the weighting coefficients are multiplied by the multipliers 15-0 to 15-n, the units can be harmonized by adding after level shifting to 8-bit data finally.

Furthermore, there is an example of the method performing masking based on a reduction from 8-bit to 6-bit given in the aforementioned embodiment, and this invention is not limited to this embodiment and the reduction from j bit to k bit ($k \geq 1$, k an integer, $j > k$) can be performed in the same way. Then, one modified embodiment of reduction of a different bit number will be explained as follows.

Figure 9:
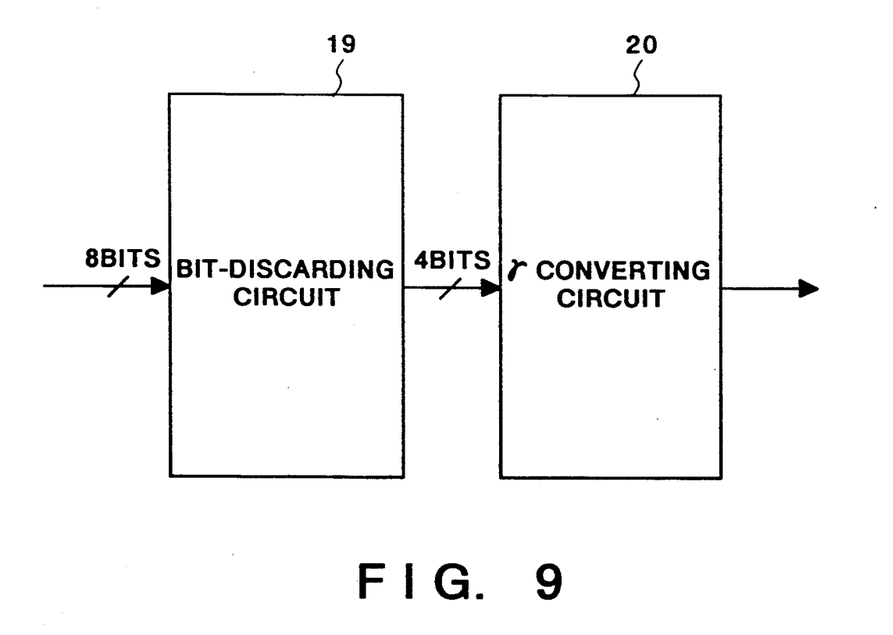
FIG. 9 shows a block diagram of a modified example of this embodiment.

FIG. 9 shows a block diagram of the modified embodiment of this invention. The circuit construction of this figure shows the modified part of the color processor 5 of the aforementioned embodiment. In this figure, the number 19 represents a bit-discarding circuit for $\gamma$ conversion consisting of the same circuit construction as the aforementioned bit-discarding circuit 10 to 12. The error diffusion in the lower-order 4 bits is performed in the bit-discarding circuit 19. The number 20 represents a normal $\gamma$ converting circuit. Here, although cathode-ray tube (CRT display) displays have only 16 gradations of brightness, the color image data is expressed in 256 gradations consisting of 8-bit data in almost all cases. Then, although the color image data should be reduced by 4 bits to output the data to the output system such as a CRT display, the reducing errors produced by the 4-bit reduction before $\gamma$ conversion can also be reduced by passing the bit-discarding circuit 19 in the same way as in the above described embodiment. The same functions and effects as those in the aforementioned embodiment can be obtained by this modified embodiment.

Figure 10:
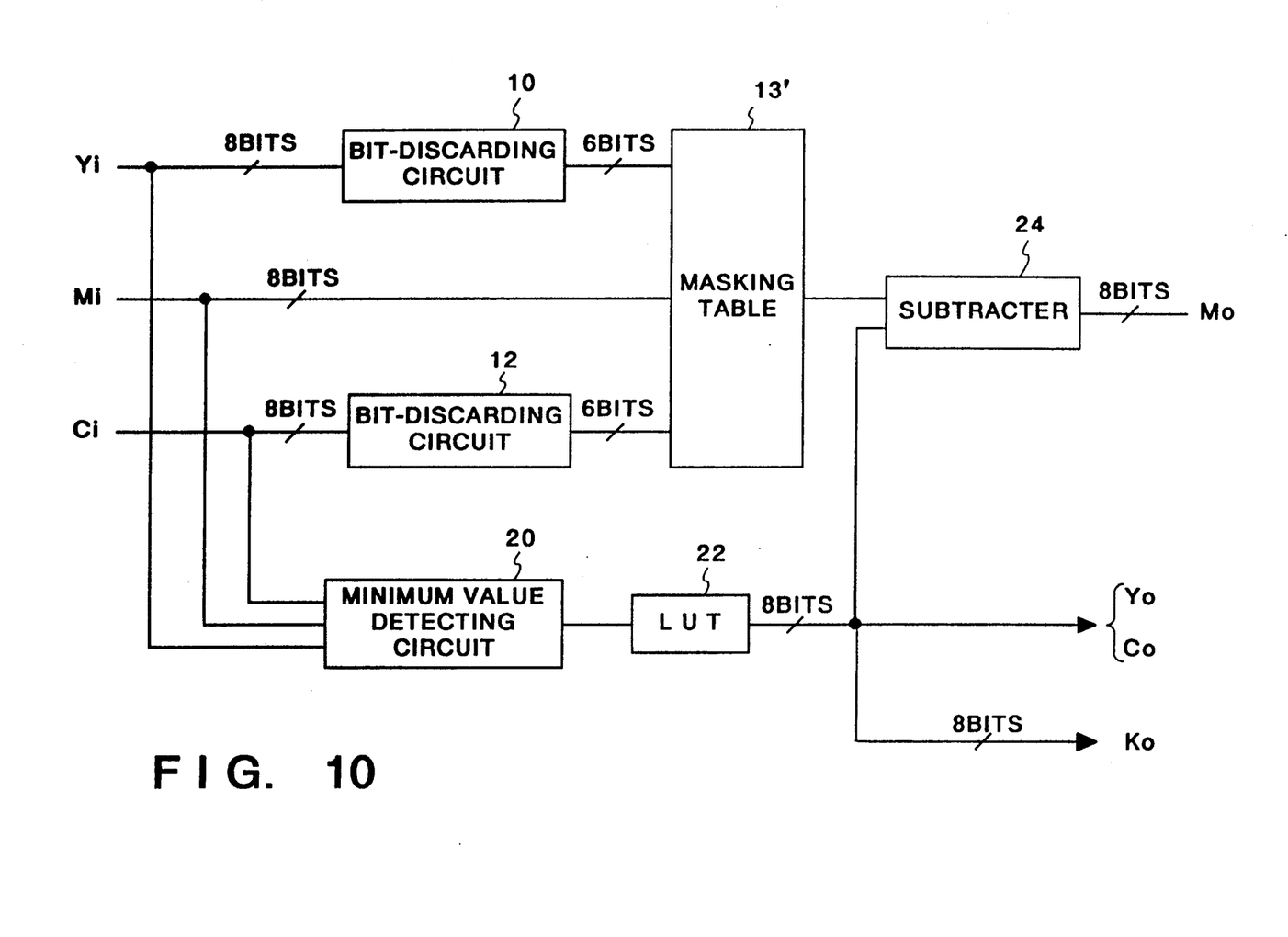
FIG. 10 shows a block diagram of another modified example of this embodiment.

FIG. 10 shows a block diagram of another modified embodiment. In FIG. 10, only the circuit construction processing the color masking on the M component in the range of the input of Yi, Mi and Ci is shown. Although the masking circuits processing the Y and C components are not shown, their construction is similar to that shown in FIG. 9. In the embodiment shown in FIG. 10, the color masking circuit processing M component is drawn. Since bit reduction is not performed on the M component as the main color, the color masking circuit is constructed so that it is mounted with the bit-discarding circuits for only the Y and C components 10 and 12, that is, since the effects of the main color are greatest when the color masking processing is performed, it is constructed so that it does not perform bit reduction on the main color but performs bit reduction on Y and C components as the effects of them are less than that of the main color.

Furthermore, since the circuits of the concentration conservational type are used as the bit-discarding circuit in this embodiment, the accuracy of color masking can be increased even if the bit reductions are performed on the Y or C component.

A minimum value detecting circuit 20 is further attached in this embodiment (FIG. 10). The output of this minimum value detecting circuit 20 is input to a subtracter 24 after predetermined conversion by look-up table (LUT) 22. The subtracter 24 subtracts the output of LUT 22 from the M component output from a masking table 13' and outputs the Mo data to be output to the printer 6 (FIG. 4).

According to the above mentioned embodiment, since the bit-discarding circuits 10 and 12 are treated in the color component data other than the main color in the color masking processing, the accuracy of the color masking processing can be increased. Furthermore, since the bit-discarding circuits 10 and 12 detect the minimum values in the data when the bit reduction is not processed when an under color removal (UCR) of each color component is processed, the accuracy of the detection of the minimum values can be increased.

The described embodiments are only illustrative and various changes and modifications may be imparted thereto without departing from the scope of the invention which is limited solely by the appended claims.

What is claimed is:

1. A color image processor comprising:
   input means for inputting a plurality of color component image data;
   weighting means for weighting the plurality of color component image data, using an error diffusing method;
   reducing means for eliminating information from the plurality of color component image data weighted by said weighting means, thereby to reduce the amount of said information; and
   combining means for combining the plurality of color component image data from which information has been eliminated by said reducing means.

2. A color image processor comprising:
   input means for inputting a plurality of color component image data;
   weighting means for weighting the plurality of color component image data, using an error diffusing method;
   reducing means for eliminating information from the plurality of color component image data weighted by said weighting means, thereby to reduce the amount of information contained in said color component data; and
   combining means for combining the plurality of color component image data from which information has been eliminated by said reducing means.
   wherein said weighting means performs weighting of the plurality of color component image data using weights whose sum is no more than a maximum value of the information to be eliminated in information-reducing by said reducing means.

3. A color image processor according to claim 2 wherein said weighting means further comprises:
   removing means for removing the data whose value is no more than said maximum value from the color component image data input by said input means;
   creating means for creating error-diffusion data to be error-diffused to another picture element based on the data removed by said removing means;
   holding means for holding the error-diffusion data created by said creating means; and
   diffusing means for weighting the color image data by diffusion processing the color image data based on the error-diffusion data of other picture elements held by said holding means.

4. A color image processor according to claim 3 wherein said removing means further comprises storing means for temporarily storing said data which is to be removed.

5. A color image processor according to claim 3 wherein said creating means further comprises means for storing a matrix which contains a plurality of the weighting coefficients equal in number to the picture elements to which the error-diffusion data is to be diffused and a calculating means for calculating the error-diffusion data based on respective weighting coefficients in said matrix and the data removed by said removing means.

6. A color image processor according to claim 5 wherein said plurality of weighting coefficients are determined in accordance with the distance from the picture element corresponding to the color component image data input by said input means such that the smaller the distance, the greater the coefficient.

7. A color image processor according to claim 5 wherein said calculating means performs multiplication.

8. A color image processor according to claim 3 wherein said holding means stores a plurality of error-diffusion data based on the first-in-first-out method and outputs error-diffusion data at the time of processing the picture element to which a particular one of the error-diffusion data is to be diffused.

9. A color image processor according to claim 3 wherein said diffusing means further comprises an adder for adding the error-diffusion data of other picture elements stored by said storing means to the color component image data input by said input means.

10. A color image processor according to claim 2 wherein said range is determined as the lower-order n bits of the color component image data input by said input means, n being a positive integer.

11. A color image processor according to claim 2 wherein said reducing means further comprises a shifting means for reducing the amount of information by shifting the weighted color component image data bit by bit.

12. A color image processor according to claim 2 wherein said combining means further comprises masking means for masking the color component image data.

13. A color image processor according to claim 2 further comprising converting means for converting the color component image data from analog RGB from to digital YMC form.

14. A color image processor comprising:
   input means for inputting data of a picture element after the data has been color-separated;
   diffusing means for diffusing the error of the data of the picture element to data of a plurality of other picture elements;
   reducing means for reducing the amount of information contained in diffused picture element data diffused from said diffusing means; and
   combining means for combining the information reduced by said reducing means and other information.

15. A color image processor according to claim 14 wherein the amount of information diffused by said diffusing means is determined to be equal to the amount of information reduced by said reduced means.

16. A color image processor according to claim 14 wherein said diffusing means further comprises:
   removing means for removing some portion from the picture element data input by said input means;
   creating means for creating a plurality of diffusion data items for use in diffusing the errors based on the picture element data input by said input means; and adding means for adding each of the plurality of diffusion data items to a different picture element.

17. A color image processor according to claim 16 wherein said creating means further comprises means for storing a matrix which contains a plurality of weighting coefficients corresponding to the number of picture elements to be diffused and calculating means for calculating a plurality of diffusion data based on each weighting coefficient in said matrix and some portion of data removed by said removing means.

18. A color image processor according to claim 17 wherein said plurality of weighting coefficients are determined in accordance with the distance from the picture element corresponding to the color image data input by said input means such that the smaller the distance, the greater the coefficient.

19. A color image processor according to claim 17 wherein said calculating means performs multiplication.

20. A color image processor according to claim 16 wherein the data removed by said removing means is the lower-order n bits of said input color image data, n being a positive integer.

21. A color image processor according to claim 14 wherein said reducing means further comprises a shifting means for reducing the amount of information by shifting picture element data diffused by said diffusing means by bit.

22. A color image processor according to claim 14 wherein said combining means further comprises a masking means for masking the picture element data.

23. A color image processor according to claim 14 further comprising converting means for converting the picture element data.

24. A color image processor comprising:
   supplying means for supplying a plurality of digital color component signals each represented as a specified number of bits; and
   reducing means for reducing the number of bits of the digital color component signals supplied by said supplying means, said reducing means further comprising:
      diffusion means for diffusing the data being reduced by said reducing means to other picture elements as part of the reduction of the number of bits, and
      means for processing by color-masking the digital color component signals the number of whose bits has been reduced by said reducing means.

25. A color image processor according to claim 24 wherein said diffusion means multiplies specified weighting coefficients by the data being reduced by said reducing means and diffuses said weighting coefficients to the other picture elements.

26. A color image processor according to claim 24 further comprising a visible image regenerating means for regenerating visible images corresponding to the digital color component signals which have been color-masking processed by said processing means.

* * * * *